United States Patent [19]

Desombre et al.

[11] 4,301,538
[45] Nov. 17, 1981

[54] REMOTE SURVEILLANCE AND FAULT LOCATION UNIT FOR PULSE REGENERATOR REPEATERS

[75] Inventors: Patrice Desombre, L'Etang La Ville; Jean-Pierre Steun, Lannion, both of France

[73] Assignee: Compagnie Industrielle des Telecommunications Cit-Alcatel, Paris, France

[21] Appl. No.: 88,918

[22] Filed: Oct. 29, 1979

[30] Foreign Application Priority Data

Nov. 2, 1978 [FR] France .................................. 78 31028

[51] Int. Cl.³ .......................................... H04B 17/02
[52] U.S. Cl. .......................................... 375/4; 371/48
[58] Field of Search ................. 375/4, 10; 371/5, 48, 371/72; 179/170 F, 175.3 F; 178/71 R

[56] References Cited

U.S. PATENT DOCUMENTS

| | | | |
|---|---|---|---|
| 3,873,775 | 3/1975 | Chown | 375/4 |
| 3,898,564 | 8/1975 | Waldhauer et al. | 375/4 |
| 3,916,379 | 10/1975 | Dulaney et al. | 371/5 |
| 3,987,395 | 10/1976 | Desombre et al. | 375/4 |
| 4,211,920 | 7/1980 | Wakabayaski | 179/175.3 F |

Primary Examiner—Glen R. Swann, III
Attorney, Agent, or Firm—Sughrue, Mion, Zinn, Macpeak and Seas

[57] ABSTRACT

A remote surveillance and fault location unit for installation in each pulse generator repeater in a digital transmission link uses a service signal added to the digital data signal conveyed by the link. Each unit comprises a receiver circuit (100), a time base (200) and a transmitter circuit (300) suitable for implementation as an integrated circuit. The units add data representative of the performance of the repeater at which they are located to the service signal which is then monitored at one end of the link. The remote surveillance and fault location unit comprises a receiver circuit connected to an input to the pulse generator repeater for receiving a service signal if one is present at the input, a carrier frequency and clock bit frequency recovery circuits, a transmission circuit having its output connected to a second input of the pulse regenerator repeater for transmitting a service signal corresponding to the received frame to which data has been added.

3 Claims, 4 Drawing Figures

250
REMOTE SURVEILLANCE AND FAULT LOCATION UNIT FOR PULSE REGENERATOR REPEATERS

BACKGROUND OF THE INVENTION

The present invention relates to surveillance of proper operation of a digital transmission link using pulse regenerator repeaters and to the location of any possible interruption in such a link. It concerns more particularly remote surveillance and fault location units to be situated in the pulse regenerator repeaters of a digital transmission link.

U.S. Pat. No. 3,987,395 describes a known method of remote surveillance and fault location for surveillance of a digital transmission length and for monitoring, at one of the link terminals, the error rate of the set of pulse regenerator repeaters. The method consists in applying a service signal to the link from the opposite end of the link from that at which the error rates are monitored, the service signal being added to the digital data signals conveyed by the link. The service signal is located outside the passband of the pulse regenerator repeaters and is relayed at each pulse regenerator repeater by special circuits referred to as remote surveillance and fault location units. The service signal is constituted by a low frequency carrier modulated by a very low frequency binary signal and is formed by a repetitive frame comprising a synchronising word which is usually generated at the said opposite end of the link from that where the surveillance takes place, followed by time slots in which each remote surveillance and fault locating unit inserts in turn, when it is relaying the service signal around its own pulse repeater regenerator, data significant of the error rates measured at each location along the link. The frame synchronising word may also be generated at a pulse regenerator repeater in the event that the service signal no longer reaches the repeater from further upstream. This makes it possible to locate the break in the link from the end under surveillance by counting the number of occupied time slots in the incomplete frames which arise at said end.

Remote surveillance and pulse location units equipping the pulse regenerator repeaters of such a digital transmission link receive the service signal from the pulse regenerator repeater located immediately upstream therefrom with respect of the direction of transmission towards the end at which surveillance is performed. The units demodulate the service signal to extract the frame, add data representative of the error rates of their own pulses regenerator repeaters thereto and re-transmit the service signal towards the next pulse regenerator repeater situated immediately downstream therefrom. The aim of the present invention is to provide the above-mentioned functions by means of a circuit of simple structure suitable for implementation in the form of an integrated circuit, and which is adapted for use in pulse regenerator repeaters of a digital transmission link.

SUMMARY OF THE INVENTION

The present invention provides a remote surveillance and fault location unit for implementing the method of remote surveillance and fault location of pulse regenerator repeaters in a digital transmission link using a service signal added to the digital data signal conveyed by the link, the service signal being relayed at each pulse regenerator repeater and being constituted by a low frequency carrier modulated by a very low frequency binary signal in the form of a repetitive frame comprising a synchronising word followed by time slots in which there are written in order, on each occasion that the service signal is relayed, data relative to the error rates of the pulse regenerator repeaters, the said unit being connected in the link, in parallel with a pulse regenerator repeater which is provided with an error rate measuring circuit, with service signal separator units arranged on either side of the pulse regenerator repeater in question for one transmission direction, the remote surveillance and fault location unit comprising:

a receiver circuit having its input connected via one of the separator units to an input to the pulse regenerator repeater for receiving a service signal should one be present at this input, the said receiver circuit comprising a pulse-shaping circuit followed by an envelope detector circuit for finding the frame contained in the received-service signal, and a first shift register having a serial input and both serial and parallel outputs to make it possible to access a plurality of digits in the frame in parallel, and a synchronising word decoder connected to the parallel output of the first shift register, a time base comprising a carrier frequency recovery circuit constituted by an oscillator synchronised by the output signal from the pulse-shaping circuit, and a bit-clock recovery circuit for recovering the bit frequency of the received frame, and being used to control shifting of the first shift register, and a transmission circuit having its output connected via a second separator unit to a second port of the pulse regenerator repeater for transmitting a service signal on the basis of the received frame to which data from the error rate measuring circuit has been added, the said transmission circuit comprising a second shift register having both serial and parallel inputs and serial and parallel outputs, and connected by its serial input to the serial output of the first shift register via a logic gate, having its parallel input connected to the output of the error rate measuring circuit, having its parallel output connected to the input of a free time slot decoder and having its serial output connected to a modulator, the said logic gate being opened by the synchronising word decoder and closed by the free time slot decoder, the said free time slot decoder also controlling an enable-input for parallel loading of the second shift register, and the said modulator receiving the signal to be modulated from the carrier frequency recovery circuit and the modulation signal from the serial output of the second shift register.

Further, in order to locate a possible break in the transmission link, the remote surveillance and fault location unit preferably includes:

a local synchronising word memory, a first multiplexer selectively connecting the parallel input of the second shift register either to the output of the local synchronising word memory or to the output of the error rate measuring circuit, a synchronising word absence detector connected to the output of the frame synchronising word detector, and a frame clock which provides a frequency at the frame repetition rate, and which, under the control of the synchronising word absence detector and when such an absence is detected, replaces the synchronising word detector in the control of the logic gate that connects the serial output of the first shift register to the serial input to the second shift register and which controls the first multiplexer in such a manner as to periodically connect the output of local synchronising word memory to the parallel input of the second shift register.

The unit may also comprise, in the event that the service signal is constituted by two-half frames distinguished by their synchronising words:

a second multiplexer inserted between the outputs of the error rate measuring circuit and the inputs to the first multiplexer and addressed by means of a third multiplexer, either by the synchronising word decoder or, in the absence of a detected synchronising word, by an address generator controlled by the frame clock, the said third multiplexer, and the said address generator.

BRIEF DESCRIPTION OF THE DRAWINGS

An embodiment of the invention is described by way of example with reference to the accompanying drawings, in which.

DETAILED DESCRIPTION OF THE PRESENT INVENTION

Figure 1:
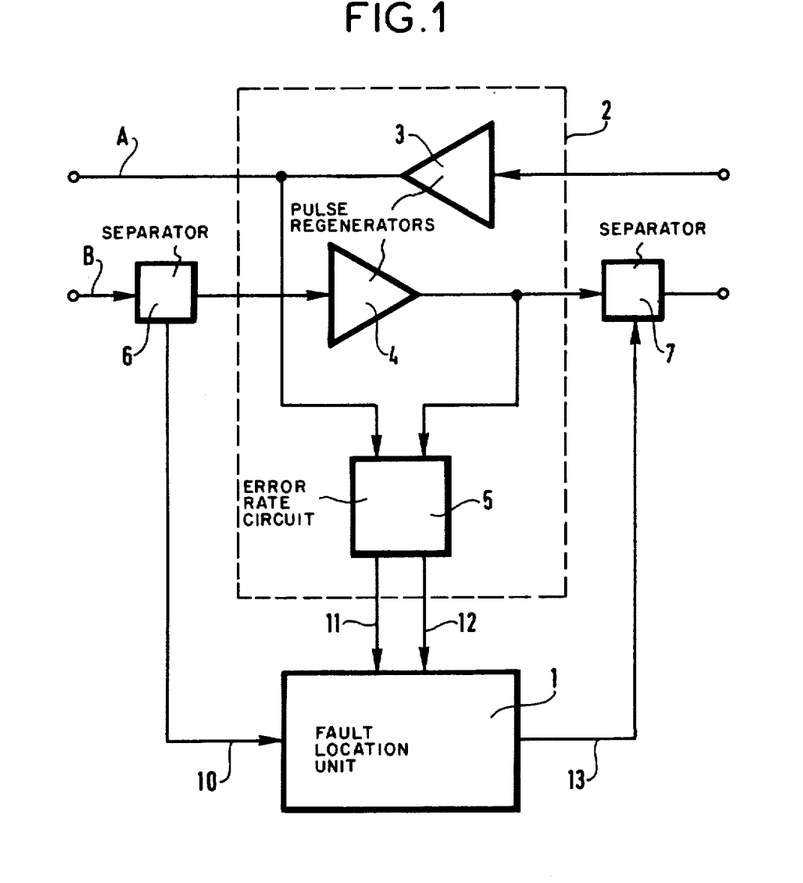
FIG. 1 shows how a remote surveillance and fault location unit is installed in a pulse regenerator repeater of a two-way digital transmission link.

The following description relaes to a remote surveillance and fault location unit located at a pulse regenerator repeater in a digital transmission link which makes use of a service signal constituted by two half frames distinguished by different frame synchronising words. The unit is intended to relay the service signal and at the same time to insert data into the first free time slot of each half frame, said data concerning the pulse regenerator repeater at which the unit is located. FIG. 1 shows an example of a remote surveillance and fault location unit 1 installed in a pulse regenerator repeater 2 in a two-way digital link. The digital link uses separate lines A and B for each direction of transmission. Its pulse regenerator repeaters 2 are of known type and include two identical pulse regenerator circuits 3 and 4, and one double error rate measuring circuit 5. One of the pulse regenerator circuits 3, is inserted in the line A and the other, 4, is inserted in the line B. The remote surveillance and fault location unit 1 is inserted in the line B in parallel with the pulse regenerator circuit 4 via separator units 6 and 7. It is also connected to both outputs 11 and 12 of the double error rate measuring circuit 5. The unit 1 relays the service signal which is conveyed by the line B and whose half-frames are associated with respective directions of transmission; it also inserts the error rate of each transmission direction as measured at the repeater in the first free time slots of respective ones of the half frames. In the following explanation it is assumed that error rate surveillance takes place at the terminal towards which the line B is conveying digital data. On this assumption the remote surveillance and fault location unit 1 is connected to the separator unit 6 via a service signal input 10, and to the separator unit 7 via a service signal output 13.

At its input, the separator unit 6 receives both a digital data signal and a service signal, said signals occupying distinct frequency bands and coming from the pulse regenerator repeater located immediately upstream thereof with respect to the transmission direction of the line B. The separator unit 6 separates the signals by means of filters and directs the digital data signal towards the pulse regenerator circuit 4 and the service signal towards the inlet 10 of the remote surveillance and fault location unit. In a digital link operating at 2.048 m bits/sec and occupying a passband of 10 kHz to 2 mHz, the service signal can use a 1 kHz carrier modulated by a very low frequency binary signal which is easily separable from the digital data by means of a low pass filter and a high pass filter. The remote surveillance and fault location unit 1 receives the service signal from the pulse regenerator repeater located immediately upstream thereof with respect to the transmission direction of the line B, it demodulates the signal to extract the frame therefrom, it adds thereto the values of the error rates measured at the outputs of the pulse regenerator circuits 3 and 4 as available at the outputs 11 and 12 of the double error rate measuring circuit 5, and it converts the new frame into a service signal which it delivers at its output 13 for application to the line B at the output of the pulse regenerator circuit 4 by means of the separator unit 7.

The double error rate measuring circuit 5 is conventional. If a bipolar code is used for line transmission of the digital data, the circuit 5 may be implemented using bipolarity rule violation detectors together with counters that are periodically reset to zero.

All the regenerator repeaters of the digital transmission link are provided, in the same manner as shown in FIG. 1, with a double error rate measuring circuit and a remote surveillance and fault location unit local thereto and connected in parallel on the line B. The end of the link which is situated at the origin of the transmission direction of the line B is also provided with a remote unit for remote surveillance and fault location. The service signal and in particular its frame synchronising words is normally generated at this end, is conveyed along the line B together with the digital data signal, is relayed at each pulse regenerator repeater by its remote surveillance and fault location unit which adds thereto the error rate measured locally in both transmission directions, and is decoded at the other end of the digital link where it arrives with a fully used frame. The service signal may also begin, if there is a break in the link, at the first pulse regenerator repeater which is not receiving a service signal from the pulse regenerator repeater located immediately upstream therefrom with respect to the transmission direction of the line B.

Figure 2:
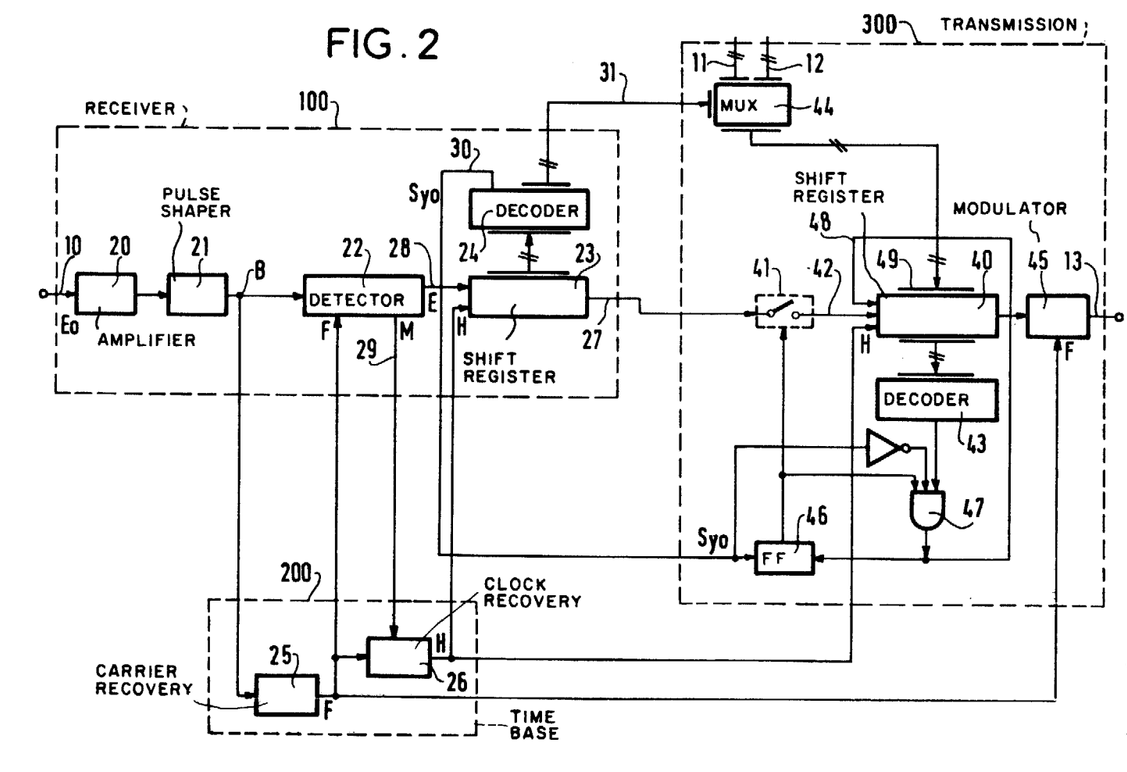
FIG. 2 is a partial block diagram of a remote surveillance and fault location unit; the diagram is limited to those components which are used in normal operations, i.e. when a service signal is being received.

FIG. 2 is a partial circuit diagram of a remote unit for remote surveillance and fault location as provided at a pulse regenerator repeater. This circuit diagram only shows those components which are used in normal operation, i.e. when a service signal is received on the input 10. In FIG. 2, all connections between components are shown by a single line, and those which actually comprise a plurality of conductors in parallel are symbolised by a double slash. The remote surveillance and fault location unit shown uses a service signal comprising a low frequency carrier which is on/off modulated by a binary signal whose bit-rate is a sub-multiple of the carrier frequency, and is organised in two-half frames of equal lengths which repeat at a frequency which is also a sub-multiple of the carrier frequency. When examining this circuit, three interdependent parts should be distinguished a receiver circuit 100 which processes the service signal as received on the input 10; a time base 200 which regenerates the various clock rates of the received service signal; and a transmission circuit 300 which adds data to the received service signal frame and which generates a new service signal.

The receiver circuit 100 comprises:

an amplifier 20 connected to the input 10 and followed by a pulse-shaping circuit 21, an envelope detector circuit 22 connected to the output of the pulse-shaping circuit 21, a first shift register 23 having a serial input and both serial and parallel outputs, and having its serial input connected to the output of the envelope detector circuit 22, and a synchronising word decoder circuit 24 connected to the parallel output of the first shift register 23.

The time base 200 comprises:

a carrier frequency recovery circuit 25 connected to the output of the pulse-shaping circuit 21 and a clock bit recovery circuit 26 with its input connected to the carrier frequency recovery circuit 25 and to the envelope detector circuit 22 and controlling shifting of the first shift register 23.

The transmission circuit 300 comprises:

a second shift register 40 having both serial and parallel inputs and outputs, a logic gate 41 connecting the serial output 27 of the first shift register 23 to the serial input 42 of the second shift register 40, a free-channel decoder 43 having its input connected to the parallel output of the second shift register 40 and operating, under the control of the synchronising word detector 24 of the receiver circuit 100 to open the logic gate 41 and enable the parallel input to the second shift register 40, a multiplexer 44 whose data inputs are connected to the outputs 11 and 12 of the double error measuring circuit (5 FIG. 1) and whose data output is connected to the parallel input of the second shift register 40 and whose addressing is controlled by the synchronising word decoder 24 of the receiver circuit 100, and a modulator 45 receiving the carrier frequency from the carrier frequency recovery circuit 25 in the time base 200 and the modulation signal at the serial output of the second shift register 40.

The service signal Eo constituted by an on/off modulated carrier arrives at the input 10 in the form of bursts of sine waves. These are amplified by the amplifier 20 and transformed into series of pulses B by the pulse shaping circuit 21 which may be a Schmidt trigger. The series of pulses B are used to synchronise a low frequency oscillator which constitutes the carrier frequency recovery circuit 25 and generates a rectangular signal F at the frequency of the received carrier. The pulses are also applied to the envelope detector circuit 22 which supplies firstly, at an output 28, a binary signal E which switches to logic level 1 at the beginning of a series of pulses and to logic level 0 at the end of a series of pulses, and secondly, at an output 29 a synchronising signal M formed by one pulse at the beginning at each series of pulses.

The envelope detector circuit 22 is made of logic circuits which periodically detect the presence of a pulse in the signal B at the rate of the signal F. To make it less sensitive to interference, it is advantageous to design it in such a manner that it will only detect the beginning of a series of pulses after four consecutive pulses have appeared in the signal B, one after the other at the frequency of the signal F, and so that it detects the end of the series of pulses only in the absence of three consecutive pulses following one another at the frequency of the signal F.

The signal F as delivered by the carrier frequency recovery circuit 25 is applied to the clock bit recovery circuit 26, which, by simple division, extracts a clock signal H whose frequency equals to the bit rate of the signal that modulates the carrier received at the input Eo. The clock bit recovery circuit 26 is synchronised by the signal M as delivered by the envelope detector circuit in such a manner as to synchronise the transitions of the signal H with the rising edges of the signal E. The clock signal H is used to control shifting of the first and second shift registers 23 and 40.

Since the data rate of the binary signal which modulates the carrier is a sub-multiple of the carrier frequency, it may be regenerated by dividing the signal F. In the practical example mentioned above using a 1 kHz carrier the binary data rate is 62.5 Hz and the clock bit recovery circuit 26 is constituted by a binary divide by 16 circuit using the signal F and reset to zero by the signal M.

The first shift register 27 shifts at the binary data rate of the signal that modulates the carrier and in synchronism with 0 to 1 transitions in the carrier whereby the digits in the frame contained in the service signal as received at the input 10 are recovered. The length of the shift register is chosen to be equal to that of the synchronising words of the two half frames of the service signal to make it possible to have these words appear at the parallel output of the first shift register 23 as connected to the synchronising word decoder 24.

The synchronising word decoder 24 may be constituted by a simple binary comparator. On an output 30, it provides a frame synchronising signal Syo constituted by one pulse each time it detects a synchronising word. On an output 31, which may comprise a plurality of digits, it marks the data contained in one detected synchronising word in binary form. In the present case this data indicates which transmission direction corresponds to the detected half frame, and serves to address the multiplexer circuit 44 to which the two outputs of the double error rate measuring circuit (5 see FIG. 1) are connected.

The logic gate 41 is controlled by a bistable circuit 46. In the following explanation, it will be supposed that the gate is open when the output of the bistable is at logic level 1 and closed in the opposite case, the closed gate applying a logic level 0 to the serial input 42 of the second shift register 40. Under these conditions, the output 30 of the synchronising word decoder 24 is connected to the set to one input of the bistable 46 in such a manner that a frame synchronising signal Syo causes the logic gate 41 to open. The reset to zero input of the bistable 46 is connected to the output of the free time slot decoder 43 via a three-input logic AND gate 47 which also receives on its other inputs the complement of the signal Syo and the signal at the output of the bistable 46.

The second shift register 40 has at least as many stages as the number of digits in a time slot of the half frame. It has a parallel input 49 connected to the output of the multiplexer circuit 44 from which it receives the binary data in parallel representative of the error rate of the line in the direction of transmission selected as a function of the half frame synchronising word detected by the receiver circuit 100. It includes an enabling input 48 which is controlled by the output of the logic AND gate 47 and which enables the data present at its parallel input 49 to be loaded into its stages.

To simplify the design of the free time slot decoder 43, each time slot has the same length, i.e. the same number of digits, and the data written in each time slot is caused to begin and end with invariant code such as 01 or 10 making it possible to detect a free time slot by simply counting the number of consecutive zeros contained in the second shift register 40. The free time slot decoder is thus constituted by a simple binary comparator.

In the absence of a service signal received at the input 10, no frame synchronising signal Syo appears and logic gates 41 and 47 are closed by the bistable 46. The second shift register 40 is loaded with zeros from its serial input 42. As soon as a synchronising word is detected in the first shift register 23 by the synchronising word decoder 24, a frame synchronising signal Syo is generated which opens the logic gate 41 and maintains the logic AND gate 47 closed for as long as is necessary for the output of the free time slot decoder 43 to change to a logical level 0, corresponding to the detection of a time slot busy state due to the passage of the synchronising word and the busy time slots which follow it to the second shift register 40. After the frame synchronising signal Syo has disappeared, the logic gate 41 is kept open for as long as the output of the free time slot decoder 43 remains at logic level 0. As soon as it passes through logic level 1, indicating that it has detected the end of the last busy time slot, it causes the bistable 46 to change state and close the gate 41, as well as enabling parallel input to the second shift register. The enabling signal is immediately removed by the blocking effect of the bistable 46 on the logic AND gate 47. This results in the data present on the parallel input 49 of the second shift register 40 being written into the first free time slot of the half frame being transmitted by the first shift register 23. The half frame with its new information is available at the serial output of the second shift register 40 and is used to control an on/off modulator 45 of conventional design.

Data concerning the error rate of the pulse regenerator repeater in one transmission direction can be written into the second shift register only once after the synchronising word has been detected because of the blocking effect of the bistable 46 acting via the logic AND gate 47 to turn off the enable input 48.

Figure 3:
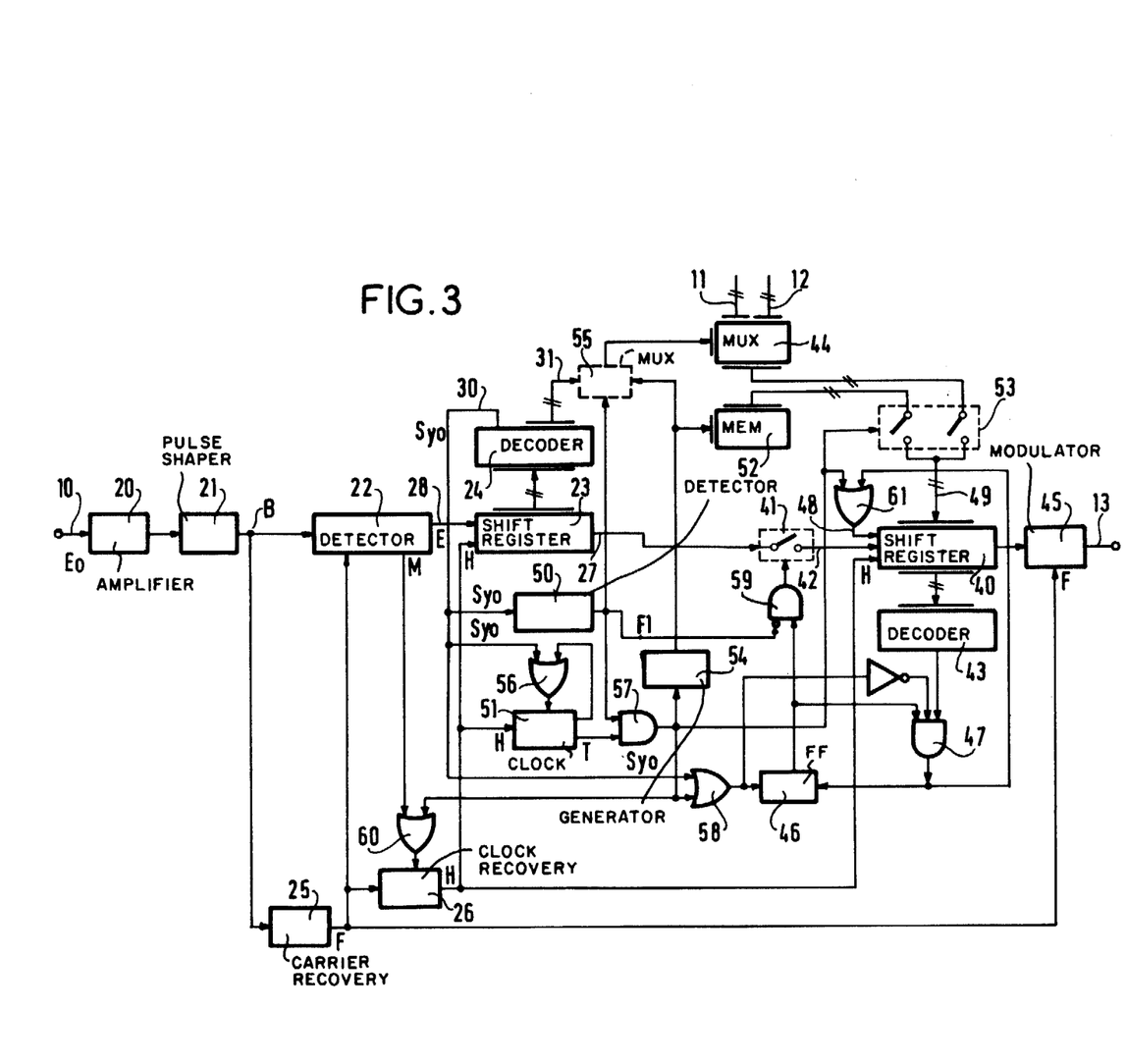
FIG. 3 is a complete block diagram of a remote surveillance and fault location unit showing those parts already shown in FIG. 2 and in addition those parts which are used in abnormal operation, i.e. in the absence of a received service signal.

The various components which have been described concerning FIG. 2 enable the remote surveillance and fault location unit to operate under normal condition, i.e. to receive a service signal at its input 10, to detect the half frame contained in the received service signal, to write data delivered from the double error rate measuring circuit into the said half frame, and to transmit a service signal from its output 13 said signal being generated on the base of the half frame together with its extra data. The remote surveillance and fault location unit includes other components for abnormal operation, i.e. when a service signal is not received at its input 10. The complete circuit diagram is shown in FIG. 3. This figure includes all the components shown in FIG. 2 with the same references and further includes:

a synchronising word absence detector 50 connected to the output 30 of the synchronising word decoder 24, a frame clock 51 driven by the signal H from the clock bit recovery circuit 26 and synchronised by the signal Syo from the synchronising word decoder 24, a synchronising word memory 52, a multiplexer 53 which connects the parallel input 49 of the second shift register 40 either to the output of the multiplexer 44 or else to the data output of the locking word memory 52 whose addressing is controlled by the frame clock 51 via an AND gate 57 controlled by the synchronising word absence detector 50, the said AND gate 57, an address generator 54 also controlled by the frame clock 51 via the AND gate 57 itself controlled by the synchronising word absence detector 50 and serving to address the synchronising word memory 52, a multiplexer 55 connecting the addressing input of the multiplexer 44 either to the output 31 of the synchronising word decoder or else to the output of the address generator 54 under the control of the synchronising word absence detector 50, and a two-input AND gate 59 having one input connected to the output of the bistable 46 and the other, an inverting input, connected to the output of the synchronising absence detector 50, with the output of the said gate controlling the logic gate 41.

The frame clock 51 generates a signal T constituted by one pulse which is repeated at the repetition frequency of the half frame. It is synchronised by the frame synchronising signal Syo in such a manner that, in normal operation, the signal T is identical to the frame synchronising signal Syo. In the above-mentioned example, using a 1 kHz carrier and a binary data rate of 62.5 Hz, the half frame repetition frequency is chosen to be a sub-multiple of the carrier and equal to 0.0813 Hz. This is obtained by dividing the carrier frequency F by 12,288 or the data rate H by 768. The frame clock T is thus constituted by a divide by 768 binary counter which is looped back on itself and has the signal H applied to its clock input from the bit frequency recovery device 26. A logic OR gate 56 is used to reset the counter to 0 not only when it reaches 768, but also in the presence of a frame synchronising signal Syo.

The address generator 54 is intended, in the absence of the frame synchronising signal Syo, to simultaneously address the multiplexer 44 and the synchronising word memory 52, in such a manner as to make each synchronising word correspond with data particular to the repeater. In the present example, the number of synchronising words is limited to two distinct words, and the multiplexer 44 has only two distinct inputs. The address generator 44 can thus be constituted by a simple divide by two circuit driven by the signal T from the frame clock 51.

The synchronising word absence detector 50 delivers an output signal F1 used to control the multiplexer 55 and the logic gate 41, and to monitor the use of the signal T from the frame clock 51. The signal T is used under the control of the synchronising word absence detector 50 to control the multiplexer 53 and the enabling input 48 of the second shift register 40 as well as to replace the frame synchronising signal Syo.

In the presence of a frame synchronising signal Syo, the synchronising word absence detector 50 supplies a signal F1 at its output at logic level 0 which has no effect on the logic gate 41 that connects the two shift registers 23 and 40 together, but which closes the logic AND gate 57. The multiplexers 53 and 55, which receive a logic level 0 signal on their control inputs set up the connections shown in FIG. 2 and keep the synchronising word memory 52 and the address generator 54 out of service. The remote surveillance and fault location unit then operates in the manner previously described with reference to FIG. 2.

In the absence of a frame synchronising signal Syo, the synchronising word absence detector 50 delivers a signal F1 at its output at logic level 1. This causes, via the multiplexer 55, the addressing input of the multiplexer 44 to be connected to the output of the address generator 54. It also causes, via the logic AND gate 59, the logic gate 41 which connects the two shift registers 23 and 40 to be closed, and also opens the logic AND gate 57 which allows the signal T from the frame clock 51 to pass. The signal T is applied to the input of the address generator 54 which it causes to step at the repetition rate of the half frames. It is also applied to the control input of the multiplexer 53 which connects the parallel input 49 of the second shift register 40 to the output of the synchronising word memory 52 during pulses of the signal T and to the output of the multiplexer 44 in the absence of a pulse in the signal T. It is also applied, via a logic OR gate 61 to the enabling input 48 of the second shift register 40. The signal T is also substituted for the missing frame synchronising signal Syo by means of a logic OR gate 58 and is used to synchronise the bit clock recovery circuit 26 via a logic OR gate 60.

In the absence of a frame synchronising signal Syo, the logic gate 41 is closed by the synchronising word absence detector 50. The first pulse of the signal T steps the address generator 54 and, by means of its effect on the multiplexer 53 and on the enabling input 48, causes a synchronising word drawn from the synchronising word memory 52 to be written into the second shift register 40. It also causes, by means of the logic OR gate 58, the bistable 46 to change state and opens the logic AND gate 47 which then is ready to transmit an instruction from the free time slot decoder as soon as one appears. This instruction causes data drawn from the multiplexer 44 to be written into the second shift register 40 as well as a further change of state of the bistable 46 which again closes the logic AND gate 47. The second pulse of the signal T steps the address generator 54 and consequently changes over the frame synchronising words and the inputs 11 and 12 from which the data is taken to be written into the second shift register after the synchronising word. It then has the same effects as above.

In the absence of a service signal received at the input 10, the remote surveillance and fault location unit thus generates a service signal constituted by a first half-frame comprising a synchronising word followed by a time clock occupied with the value of the error rate for one direction of link transmission and a second half-frame comprising another synchronising word followed by the value of the error rate for the other transmission direction.

To facilitate recognising whether the half-frame originates from the end of the link or from a pulse regenerator repeater, the frame synchronising word memory of the remote surveillance and fault location unit at the pulse regenerator repeaters are loaded with synchronising words which are different from those written in the synchronising word memory of the remote surveillance and fault location unit located at the said end.

Figure 4:
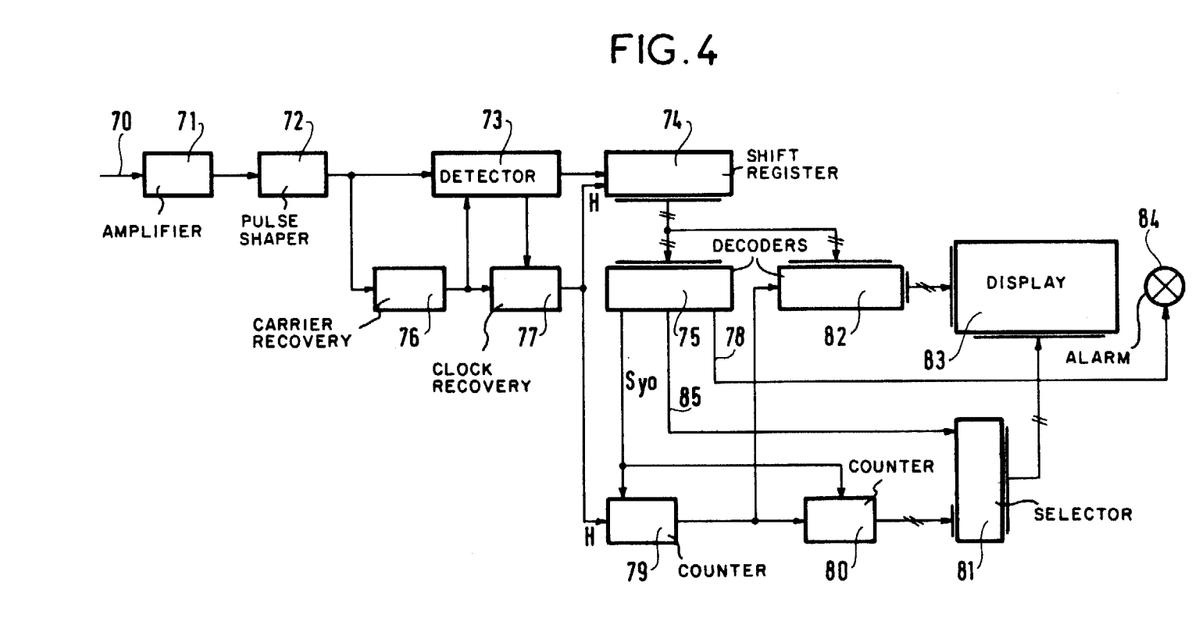
FIG. 4 is a block diagram of a device for receiving the service signal as relayed by the remote surveillance and fault location units in the pulse regenerator receivers of a digital transmission link.

FIG. 4 is a block diagram of a device for displaying the data contained in the service signal as relayed by the remote surveillance and fault location units described with reference to FIGS. 2 and 3. This device is connected to the line B via a filter unit, at the terminal of the digital length where the surveillance of the error rate is performed. It comprises a receiver circuit, a time base and a decoding and display circuit.

The receiver circuit and the time base are of analagous design to those of a remote surveillance and fault location unit as already described. The receiver circuit comprises an input amplifier 71 followed by a pulse-shaping circuit 72, an envelope detector circuit 73 and a shift register 74 having a serial input and a parallel output. It also comprises a synchronising word decoder 75 connected to the parallel output of the shift register 74. The time base comprises a carrier frequency recovery circuit 76 connected to the output of the pulse-shaping circuit 72 and a clock bit recovery circuit 77 connected to the output of the carrier frequency recovery circuit 76 and to the envelope detector 73.

The receiver circuit and the time base operate in an analagous manner to those of a remote surveillance and fault location unit as already described. In the same manner, they make it possible to write the half-frame contained in the received service signal into a shift register, to generate the bit clock signal H in synchronisation with the digits received in the half-frame, and a frame synchronising signal Syo synchronised with the appearance of the synchronising words, and to distinguish half-frames containing error rates relating to one transmission direction from those containing error rates relating to the other transmission direction, by means of the synchronising words. The synchronising word decoder 75 also delivers on an AND output 78, a signal indicative of the origin of the synchronising words.

The decoding and display circuit comprises:

a modulo p counter 79 driven by the signal H delivered by the bit clock recovery circuit 77 and reset to zero by the frame synchronising signal Syo delivered by the synchronising word decoder 75, a time slot counter 80 driven by the signal at the output of the modulo p counter 79 and reset to zero by the frame synchronising signal Syo, a time slot selector 81 addressed by the signal at the output of the time slot counter 80 and by the signal indicative of the transmission direction as delivered on its output 85 by the synchronising word decoder 75, an error rate decoder 82 having one data input connected to the parallel output of the shift register 74 and one enabling input connected to the output modulo p counter 79, a multiplex display unit 83 connected firstly to the output of the error rate decoder 82 and secondly to that of the channel selector 81, and an alarm 84 connected to the output 78 of the synchronising word decoder 75.

The number p is chosen to be equal to the number of digits in a time clock. The modulo p counter 79 thus determines the end of a time slot. It triggers the error rate decoder 82 at each instance that it is receiving the content of a time slot on its input. It also causes the time slot counter 80 to step and consequently steps the addressing of the display unit 83.

The error rate decoder 82 is constituted, for example, by a read only memory (ROM) with a decoding matrix recording therein.

The display unit 83 has a memory which receives the data to be displayed from the error rate decoder 82 and which is addressed by the time slot selector 81.

The alarm 84 is triggered when the synchronising word decoder 75 detects a synchronising word corresponding to one of those generated by a remote surveillance and fault location unit associated with one of the pulse regenerator repeaters of the link. Once triggered, it indicates a break in transmission which may be located with respect to the pulse regenerator repeaters by counting the number of time slots in the received frame, i.e. the number of error rates displayed for one transmission direction.

It is also possible to provide a more sophisticated alarm which, under the control of the output 78 of the synchronising word decoder 75, counts the number of occupied time slots in one half-frame, the counting being performed from a special output of error rate decoder 82 which is excited only when the binary number applied to the input of the error rate decoder is other zero.

The apparatus which has been described is essentially constituted of logic circuits and is therefore suitable for large scale integration.

We claim:

1. A remote surveillance and fault location unit for implementing the method of remote surveillance and fault location of pulse regenerator repeaters in a digital transmission link using a service signal added to the digital data signal conveyed by the link, the service signal being relayed at each pulse regenerator repeater and being constituted by a low frequency carrier modulated by a very low frequency binary signal in the form of a repetitive frame comprising a synchronizing-word followed by time slots in which there are written in order, on each occasion that the service signal is relayed, data relative to the error rates of the pulse regenerator repeaters, the said unit being connected, in the link, in parallel with a pulse regenerator repeater which is provided with an error rate measuring circuit and service signal separator units arranged on either side of the pulse regenerator repeater in question for one transmission direction the said remote surveillance and fault location unit comprising:

a receiver circuit having its input connected via one of the separator units to a first input to the pulse regenerator repeater for receiving a service signal should one be present at this input, the said receiver circuit comprising a pulse-shaping circuit followed by an envelope detector circuit for detecting the frame by demodulating the received service signal, and a first shift register having a serial input and both serial and parallel outputs to make it possible to access a plurality of digits in the frame in parallel, and a synchronizing word decoder connected to the parallel output of the first shift register, a time base comprising a carrier frequency recovery circuit constituted by an oscillator synchronized by the output signal from the pulse-shaping circuit, and a clock bit recovery circuit for recovering the bit frequency of the received frame, and being used to control shifting of the first shift register, and a transmission circuit having its output connected via a second separator unit to a second input to the pulse regenerator repeater for transmitting a service signal corresponding to the received frame to which data from the error rate measuring circuit has been added, the said transmission circuit comprising a second shift register having both serial and parallel inputs and serial and parallel outputs, and connected by its serial input to the serial output of the first shift register via a logic gate, having its parallel input connected to the outputs of the error rate measuring circuit, having its parallel output connected to the outputs connected to the input of a free-time-slot decoder and having its serial output connected to a modulator, the said logic gate being opened by the synchronizing word decoder on detecting sychronizing word and closed by the free-time-slot decoder on detection of a free channel, the said free-time-slot decoder also controlling an enable-input to enable parallel loading of the second shift register on detection of a free channel, and the said modulator receiving the signal to be modulated from the carrier frequency recovery circuit and the modulation signal from the serial output of the second shift register.

2. A unit according to claim 1, further comprising:

a local synchronizing-word memory, a multiplexer selectively connecting the parallel input of the second shift register either to the output of the local synchronizing-word memory or to the output of the error rate measuring circuit, a synchronizing-word-absence detector connected to the output of the synchronizing-word decoder, and a frame clock which provides a frequency T at the frame repetition rate, which, under the control of the synchronizing-word-absence detector and when such an absence is detected, replaces the synchronizing word decoder in the control of the logic gate that connects the serial output of the first shift register to the serial input to the second shift register and which controls the multiplexer in such a manner as to periodically connect the output of local synchronizing-word memory to the parallel input of the second shift register.

3. A unit according to claim 2, further comprising:

a second multiplexer inserted between the output of the error rate measuring circuit and the input to the first-recited multiplexer and addressed by means of a third multiplexer, either by the synchronizing-word decoder or, in the absence of a detected synchronizing-word, by an address generator controlled by the frame clock, the said third multiplexer, and the said address generator.

* * * * *